US012603518B2

(12) United States Patent (10) Patent No.: US 12,603,518 B2
Mori                                    (45) Date of Patent:     Apr. 14, 2026

(54) REDUNDANT POWER SUPPLY SYSTEM

(71) Applicant: TOYOTA JIDOSHA KABUSHIKI KAISHA, Toyota (JP)

(72) Inventor: Tatsunori Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/930,084

(22) Filed: Oct. 29, 2024

(65) Prior Publication Data

US 2025/0246929 A1      Jul. 31, 2025

(30) Foreign Application Priority Data

Jan. 31, 2024    (JP) ................................. 2024-012888

(51) Int. Cl.
H02J 9/06          (2006.01)
B60R 16/033       (2006.01)
(52) U.S. Cl.
CPC .............. H02J 9/06 (2013.01); B60R 16/033 (2013.01)
(58) Field of Classification Search
CPC ........................................................ H02J 9/06
See application file for complete search history.

(56) References Cited

U.S. PATENT DOCUMENTS

2022/0271559 A1* 8/2022 Shibata .............. G01R 31/3835

FOREIGN PATENT DOCUMENTS

JP          2021-090246 A       6/2021

* cited by examiner

*Primary Examiner* — Daniel Kessie
(74) *Attorney, Agent, or Firm* — SoraIP, Inc.

(57)                    ABSTRACT

A redundant power supply system comprising: a first load requesting power less than a first voltage; a second load requesting power less than or equal to a second voltage than the first voltage; and a redundant power supply supplying backup power to the first load and the second load when the main power supply fails, wherein the redundant power supply notifies the first load of a failure of the main power supply when the main power supply fails, and supplies backup power at an output voltage satisfying the request of the second load, and wherein the first load does not output an erroneous diagnosis when an input voltage from the redundant power supply is less than the first voltage or when a failure of the main power supply is notified from the redundant power supply.

5 Claims, 4 Drawing Sheets

REDUNDANT POWER SUPPLY SYSTEM

CROSS-REFERENCE TO RELATED APPLICATION

This application claims priority to Japanese Patent Application No. 2024-012888 filed on Jan. 31, 2024, incorporated herein by reference in its entirety.

BACKGROUND

1. Technical Field

The present disclosure relates to a redundant power supply system including a redundant power supply provided for backup of a main power supply.

2. Description of Related Art

Japanese Unexamined Patent Application Publication No. 2021-090246 (JP 2021-090246 A) discloses a system including a redundant power supply capable of supplying a backup power when an abnormality occurs in a main power supply that supplies a power to a load (actuator) mounted on a vehicle. In the system disclosed in JP 2021-090246 A, redundant power supplies are individually provided for a shift-by-wire (SBW) and a brake, which are loads that require backup voltages different from each other.

SUMMARY

In the system disclosed in JP 2021-090246 A, a redundant power supply needs to be provided for each of the shift-by-wire (SBW) and the brake. Therefore, there are problems in that the mounting space in the vehicle increases, and the system cost increases.

On the other hand, a configuration is conceivable in which a backup power is supplied from a single redundant power supply to the shift-by-wire (SBW) and the brake, but these loads require input voltages different from each other. Therefore, there arises a problem in that a wrong diagnosis result (wrong diagnosis) is output depending on the voltage value of the backup power output from the redundant power supply.

The present disclosure provides a redundant power supply system that makes it possible to prevent a wrong diagnosis from being output when a backup power is supplied from a single redundant power supply to a plurality of loads that require input voltage different from each other.

In order to solve the above problems, an aspect of the technique of the present disclosure provides a redundant power supply system comprising:

a first load that requires a power less than a first voltage;

a second load that requires a power equal to or higher than a second voltage lower than the first voltage; and a redundant power supply that provides a backup power to each of the first load and the second load at a time of a failure of a main power supply, wherein, when the redundant power supply detects that the main power supply has failed, the redundant power supply issues notification about the failure of the main power supply to the first load, and supplies the backup power at an output voltage satisfying the requirement of the second load, and the first load does not output a wrong diagnosis when an input voltage from the redundant power supply is less than the first voltage or when the notification about the failure of the main power supply is received from the redundant power supply.

The redundant power supply system of the present disclosure makes it possible to prevent a wrong diagnosis from being output, when the backup power is supplied from a single redundant power supply to a plurality of loads (the first load and the second load) that require input voltages different from each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A redundant power supply system according to the present disclosure notifies a shift-by-wire device of a failure of a main power supply. In this way, the backup function by the redundant power supply for the shift-by-wire device and the brake device in which the input voltage request of the power supply is different is integrated, and the request of the plurality of devices is realized without changing the system configuration or adding/changing the element circuit.

Hereinafter, an embodiment of the present disclosure will be described in detail with reference to the drawings.

Embodiment

Configuration

Figure 1:
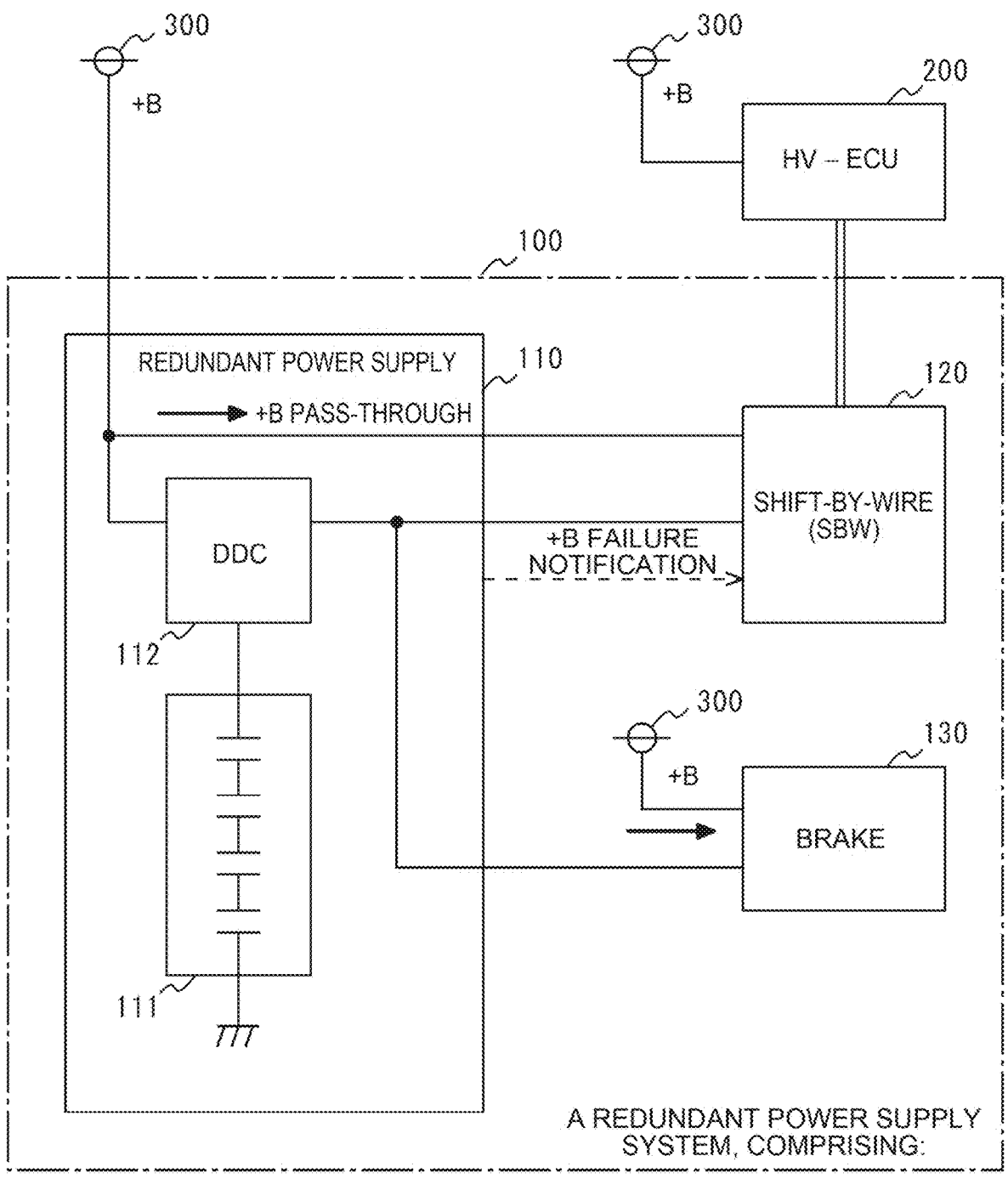
FIG. 1 is a functional block diagram of a redundant power supply system and a peripheral portion thereof according to an embodiment of the present disclosure.

FIG. 1 is a functional block diagram of a redundant power supply system 100 and a peripheral portion thereof according to an embodiment of the present disclosure. The redundant power supply system 100 illustrated in FIG. 1 includes a redundant power supply 110, a shift-by-wire (SBW) 120, and a brake 130. The redundant power supply system 100 and HV-ECU 200 are mounted on vehicles or the like, and operate by receiving electric power from a main power supply (+B power supply) 300.

The main power supply 300 is a power supply source such as a generator including an alternator for generating electricity and DCDC converters for converting generated electricity to a predetermined voltage, or a secondary battery configured to be chargeable and dischargeable such as a lithium-ion battery or a lead-acid battery.

The redundant power supply 110 is configured to function as an auxiliary power supply for backing up power to the shift-by-wire 120 and the brake 130 when an abnormality occurs in the power supply from the main power supply 300 to the shift-by-wire (SBW) 120 and the brake 130. The abnormal power supply may be caused by a power failure of the main power supply 300 or the like. The redundant power supply 110 includes a sub-power supply 111 and DCDC converters (DDC) 112.

The sub-power supply 111 is a power supply source that is constituted by a secondary battery such as a lithium-ion battery configured to be chargeable and dischargeable, or a power storage element such as a capacitor. The sub-power supply 111 is connected to a DCDC converter (DDC) 112 so that the electric power inputted from the main power supply 300 can be charged. The sub-power supply 111 is connected to DCDC converter (DDC) 112 so that the electric power (backup power) stored therein can be discharged to the shift-by-wire (SBW) 120 and the brake 130.

DCDC converter (DDC) 112 is a power converter (step-up/step-down type) for charging and discharging the electric power of the sub-power supply 111. DCDC converters 112 can convert the electric power inputted from the main power supply 300 into electric power of a predetermined voltage and output the electric power to the sub-power supply 111 based on an instruction from a control unit (not shown). In addition, DCDC converters 112 can convert the electric power stored in the sub-power supply 111 into electric power of a predetermined voltage based on an instruction from a control unit (not shown) and output the electric power to the shift-by-wire (SBW) 120 and the brakes 130.

Devices (or systems), such as shift-by-wire (SBW) 120 and brake 130, may be on-board loads for implementing predetermined functions for vehicles, and may be devices that require a particularly redundant power supply configuration. The plurality of devices is connected and configured to each receive power from the main power supply 300 without passing through the redundant power supply system 100. The plurality of devices is connected and configured to receive backup power based on the sub-power supply 111 from the redundant power supply system 100. Note that the plurality of devices mounted on the vehicle is not limited to those illustrated in FIG. 1.

The shift-by-wire (SBW) 120 is a device (first load) that performs shift-by-wire control in which a gear stage of a transmission (not shown) can be changed by an electric signal. The shift-by-wire 120 operates with power supplied directly from the main power supply 300 via the redundant power supply 110 (+B pass-through) when the main power supply 300 is normal. The shift-by-wire 120 operates with power supplied from the sub-power supply 111 via a DCDC converter (DDC) 112 when the main power supply 300 fails. When the main power supply 300 fails, the shift-by-wire 120 can receive a notification (hereinafter referred to as "+B failure notification") indicating that the main power supply 300 fails from the redundant power supply 110. Reception of the +B failure notification can be realized by communication using an existing Zika line connecting the redundant power supply 110 and the shift-by-wire 120. In addition, the shift-by-wire 120 is communicatively coupled to an HV-ECU 200 that controls a hybrid-system of vehicles.

The shift-by-wire (SBW) 120 of the present embodiment does not output the diagnosis data indicating the anomaly detection or the anomaly diagnosis when the voltage inputted as the power supply from the redundant power supply 110 is less than 10V or the +B failure notification is received from the redundant power supply 110. That is, the shift-by-wire (SBW) 120 establishes a so-called dialog mask (dialog invalidation). Examples of the state in which the value of the input voltage is less than 10V include a state in which the main power supply 300 fails due to a ground fault or the like, a state in which a large current flows temporarily due to power steering, braking, or the like (short-term load), a state in which the power is cranked for starting the engine, a state in which unexpected power is consumed from the sub-power supply 111 due to a failure of a high-voltage DCDC converter 15 (not shown), or the like.

The brake 130 is a device (second load) that performs brake control capable of generating a braking force on the vehicle. The brake 130 operates with power supplied from the main power supply 300 when the main power supply 300 is normal, and operates with power supplied from the sub power supply 111 via DCDC converters (DDC) 112 when the main power supply 300 fails.

HV-ECU 200 is an electronic control unit (ECU: Electronic Control Unit) that performs, for example, hybrid control of vehicles. In this HV-ECU 200, predetermined communication is performed with the shift-by-wire (SBW) 120, and when the main power supply 300 fails, the communication with the shift-by-wire 120 is stopped.

Example of Operation

Figure 2:
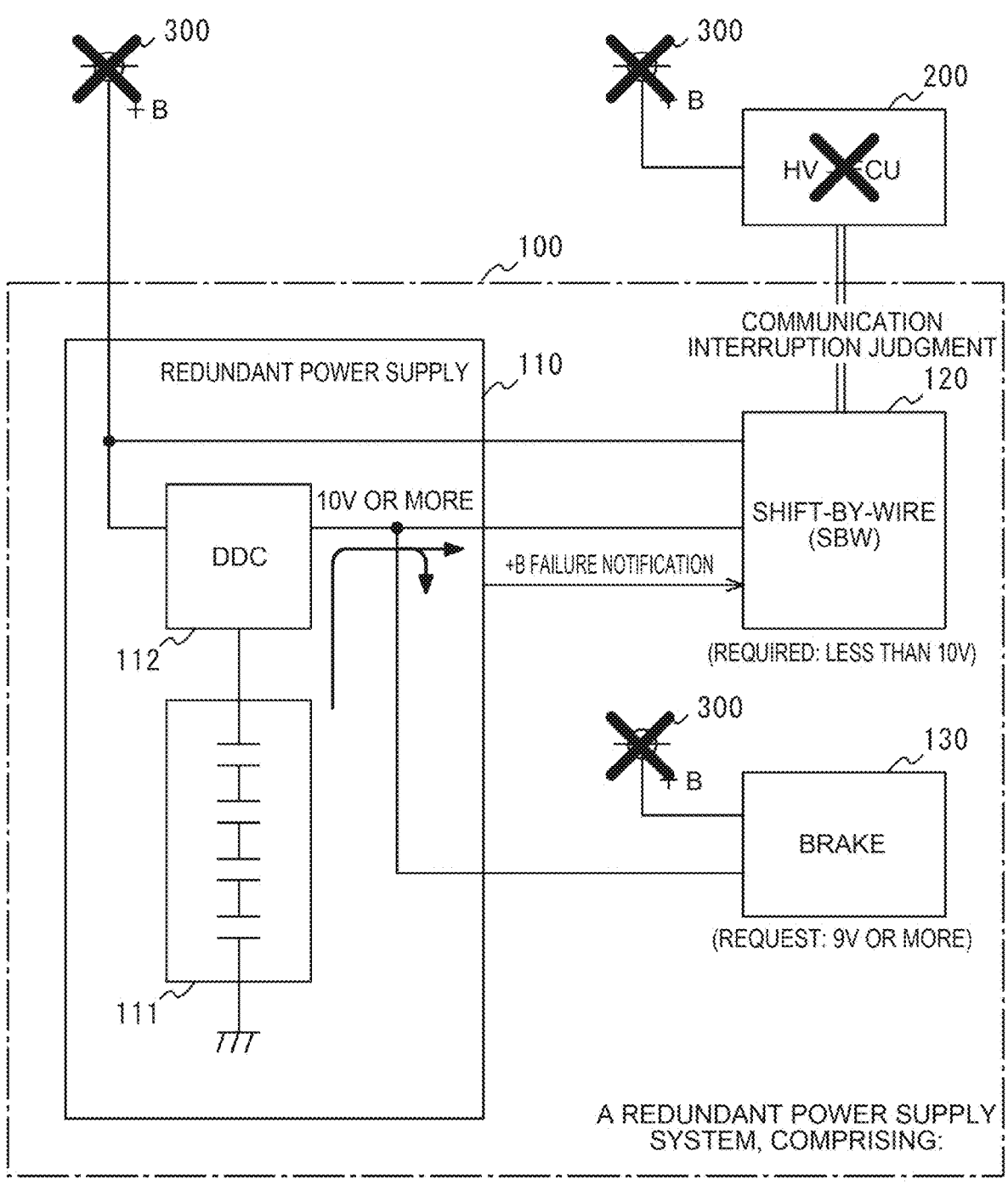
FIG. 2 is a diagram for explaining the operation of the redundant power supply system when the main power supply fails.

With further reference to FIG. 2, the operation of the redundant power supply system 100 according to an embodiment of the present disclosure will now be described. FIG. 2 is a diagram for explaining an operation of the redundant power supply system 100 when the main power supply 300 fails.

In this exemplary operation, it is assumed that the shift-by-wire (SBW) 120 requires a voltage lower than 10V (first voltage) and the brake 130 requires a voltage equal to or higher than 9V (second voltage) as the voltage of the power supply supplied from the redundant power supply 110. The second voltage is set lower than the first voltage.

Step 1

When an abnormality such as a failure occurs in the main power supply 300 (indicated by "X" in FIG. 2), the redundant power supply 110 detects the failure of the main power supply 300. This detection can be performed by monitoring the voltage of the wiring to which the main power supply 300 is connected, or the like. In order to prevent the failure of the main power supply 300 from being affected by the shift-by-wire (SBW) 120, a switch (e.g., a relay) capable of performing an electric cutoff process may be inserted on the +B pass-through path. In addition, when the main power supply 300 fails, the operation of HV-ECU 200 is stopped, and communication with the shift-by-wire 120 is interrupted.

Step 2

In response to detecting a failure of the main power supply 300, the redundant power supply 110 transmits a +B failure notification to the shift-by-wire (SBW) 120. The transmission of the +B failure notification is performed using a dedicated Zika line connecting the redundant power supply 110 and the shift-by-wire 120. The redundant power supply 110 also provides backup power from the sub-power supply 111 to the shift-by-wire 120 and the brake 130, respectively, to meet the input voltage requirements of the brake 130. The backup power is power obtained by controlling the output voltage of DCDC converter (DDC) 112 to be equal to or higher than 10V. A voltage drop due to the wire resistors from DCDC converters 112 to the brakes 130 is taken into account (added) to the output voltage equal to or higher than this 10V. Note that, if the input-voltage requirement (equal to or greater than 9V) of the brake 130 can be satisfied, the backup power obtained by controlling the output voltage to a voltage lower than 10V (for example, 9.3V to 9.9V range if the voltage drop is 0.2V) may be supplied from DCDC converter 112 to the shift-by-wire 120 and the brake 130, respectively.

Step 3

The shift-by-wire (SBW) 120 determines whether or not a dialog mask is to be established when outputting the dialog data based on the communication interruption determination from HV-ECU 200. More specifically, the shift-by-wire 120 determines that a diagnosis mask is to be established when the voltage of the backup power inputted from the redundant power supply 110 is less than 10V or when a +B failure notification is received from the redundant power supply 110.

With the above-described operation, even if the voltage of the backup power inputted from the redundant power supply 110 becomes equal to or higher than 10V due to the failure of the main power supply 300, the shift-by-wire (SBW) 120 can establish the diagnosis mask by receiving the +B failure notification. Thus, even when the input voltage of the shift-by-wire 120 is equal to or higher than 10V value (the input voltage request less than 10V value cannot be satisfied), it is possible to satisfy the request to avoid erroneous determination (erroneous diagnosis output) in the shift-by-wire 120 while satisfying the input voltage request equal to or higher than 9V value in the brake 130.

Operations and Effects

As described above, according to the redundant power supply system 100 according to the embodiment of the present disclosure, the shift-by-wire (SBW) 120 is notified of the abnormal occurrence (power failure) of the main power supply 300 that can be detected by the redundant power supply 110. By receiving the power failure notification, even if the shift-by-wire 120 receives an input voltage higher than the input voltage requested by it from the redundant power supply 110, it is possible to implement a diagnosis mask and prevent an erroneous diagnosis from being output.

In addition, according to the redundant power supply system 100 of the present embodiment, an existing Zika line can be used for the power failure notification from the redundant power supply 110 to the shift-by-wire (SBW) 120. Therefore, it is possible to easily supply the backup power from the single redundant power supply 110 to the shift-by-wire 120 and the brake 130 without needing to change the system configuration, add/change the element circuit, or the like.

Reference Example 1

Figure 3:
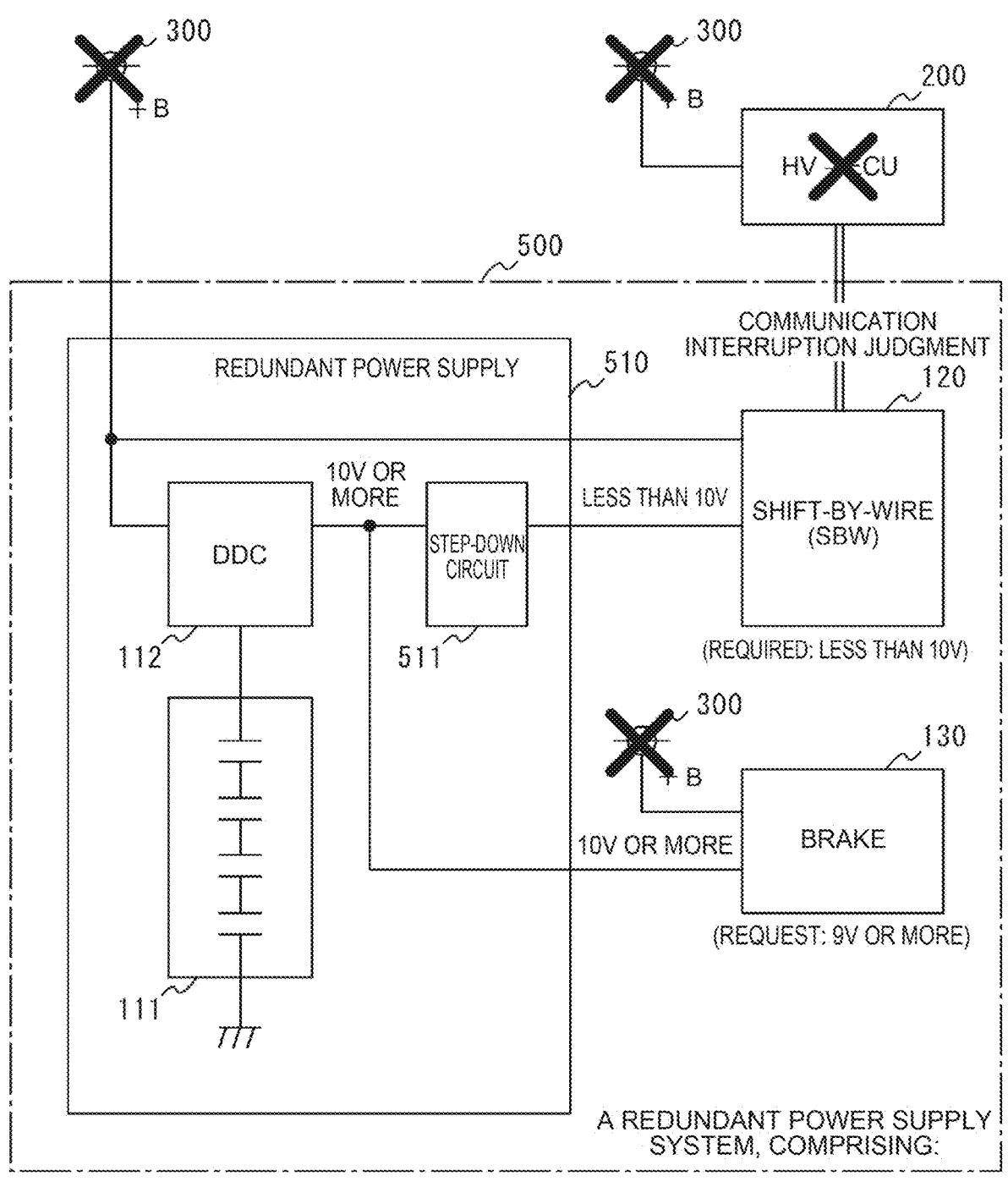
FIG. 3 is a functional block diagram of a redundant power supply system according to a first embodiment of the present disclosure.

FIG. 3 is a functional block diagram of a redundant power supply system 500 according to a first embodiment of the present disclosure and its peripheral portions. The redundant power supply system 500 of Reference Example 1 differs from the redundant power supply system 100 described above in the configuration of the redundant power supply 510.

The redundant power supply 510 of the redundant power supply system 500 includes step-down circuitry 511 between DCDC converters (DDC) 112 and shift-by-wire (SBW) 120. The step-down circuit 511 is configured to reduce the input-side voltage to a predetermined voltage and output the voltage. In the redundant power supply 510, when a failure of the main power supply 300 is detected, the output voltage of DCDC converters 112 is controlled to be equal to or higher than 10V, and the input voltage of the shift-by-wire 120 is controlled to be lower than 10V in the step-down circuit 511. Thus, both the input voltage request of the shift-by-wire 120 and the input voltage request of the brake 130 can be satisfied.

Thus, when the configuration of the redundant power supply system 500 of Reference Example 1 is adopted, the system configuration needs to be changed or the device circuitry needs to be added, but the +B failure notification from the redundant power supply 510 to the shift-by-wire (SBW) 120 is not performed. Further, it is possible to provide backup power from a single redundant power supply 510 to the shift-by-wire 120 and the brake 130 while satisfying the requirements of the shift-by-wire 120 and the brake 130, respectively.

Reference Example 2

Figure 4:
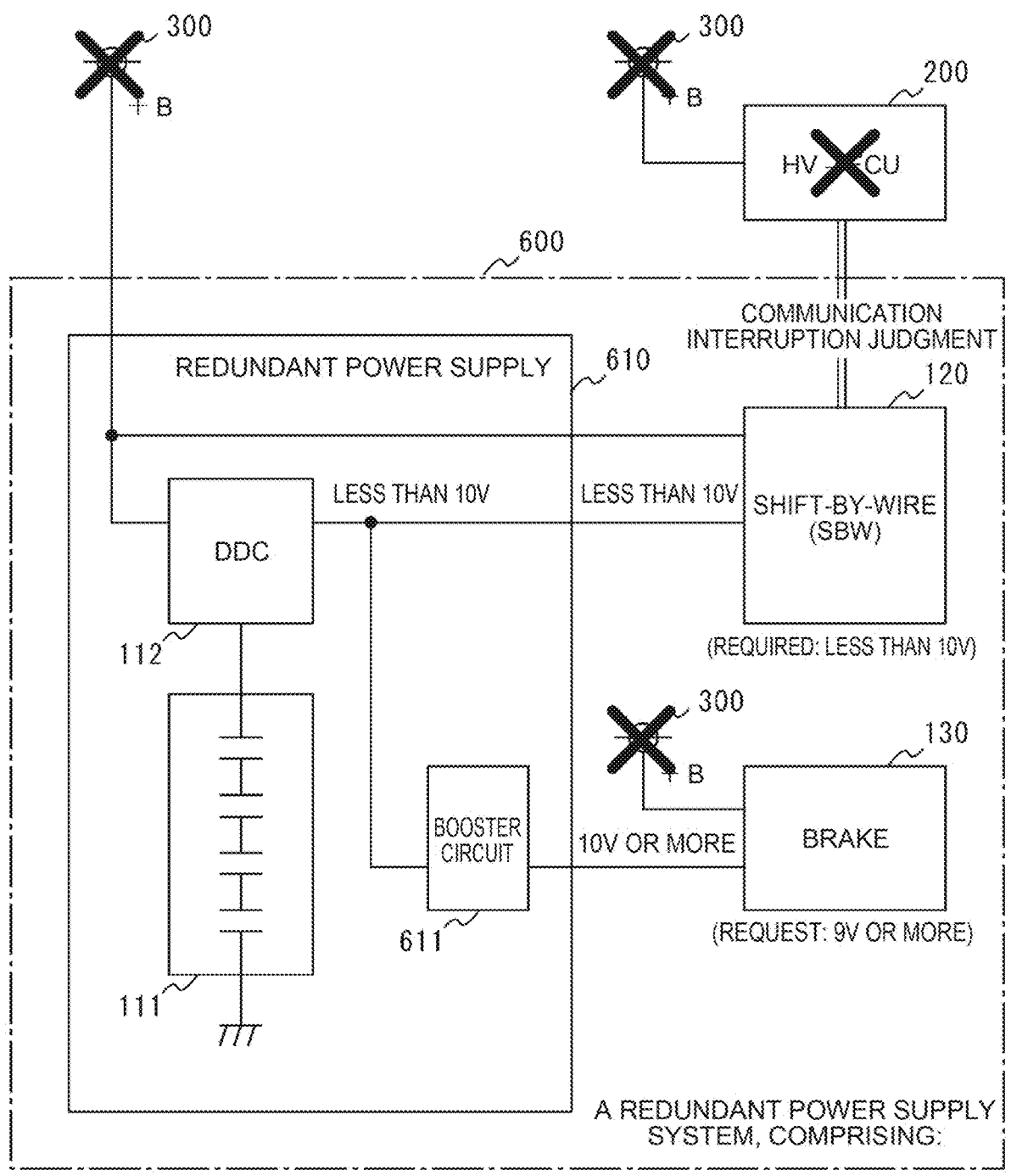
FIG. 4 is a functional block diagram of a redundant power supply system and a peripheral portion thereof according to a second embodiment of the present disclosure.

FIG. 4 is a functional block diagram of a redundant power supply system 600 and its peripheral portions according to a second embodiment of the present disclosure. The redundant power supply system 600 of Reference Example 2 differs from the redundant power supply system 100 described above in the configuration of the redundant power supply 610.

The redundant power supply 610 of the redundant power supply system 600 includes a booster circuit 611 between DCDC converters (DDC) 112 and the brakes 130. The step-up circuit 611 is configured to increase the voltage on the input side to a predetermined voltage and output the voltage. In the redundant power supply 610, when a failure of the main power supply 300 is detected, the output voltage of DCDC converters 112 is controlled to be less than 10V, and the input voltage of the brakes 130 is boosted to be equal to or higher than 10V in the booster circuit 611. This can satisfy both the input voltage requirement of the shift-by-wire (SBW) 120 and the input voltage requirement of the brake 130.

As described above, when the configuration of the redundant power supply system 600 of Reference Example 2 is adopted, the system configuration needs to be changed or the device circuitry needs to be added, but the +B failure notification from the redundant power supply 610 to the shift-by-wire (SBW) 120 is not performed. Further, it is possible to provide backup power from a single redundant power supply 610 to the shift-by-wire 120 and the brake 130 while satisfying the requirements of the shift-by-wire 120 and the brake 130, respectively.

The redundant power supply system of the present disclosure can be used, for example, when it is desired to supply backup power from a single redundant power supply to a plurality of loads having different input voltage requests.

What is claimed is:

1. A redundant power supply system, comprising:
a first load that requires an input voltage lower than a first voltage,
the first load being configured to
receive a power,
activate a diagnosis mask in a case where the input voltage of the received power is lower than the first voltage, the diagnosis mask preventing a diagnosis that indicates an anomaly detection from being output, and not output the diagnosis in a state where the diagnosis mask is active;
a second load that requires an input voltage equal to or higher than a second voltage lower than the first voltage;
a main power supply configured to provide the power to the first load and the second load directly; and a redundant power supply configured to detect that the main power supply has failed, and in response to a detection that the main power supply has failed, issue a notification about a failure of the main power supply to the first load, and supply a backup power to the first load and the second load at an output voltage equal to or higher than the first voltage, wherein the first load is further configured to receive the notification from the redundant power supply, and activate the diagnosis mask in response to receiving the notification even in a case where the input voltage is equal to or higher than the first voltage, wherein the first load is further configured to communicate with an electronic control unit (ECU) that is configured to receive the power from the main power supply and control a hybrid system of a vehicle on which the redundant power supply system is mounted, detect disconnection with the ECU, and determine to establish the diagnosis mask in response to a detection of the disconnection with the ECU, and the diagnosis mask is determined to be activated in a case where the input voltage is lower than the first voltage and, in a case, where the notification has been received from the redundant power supply.

2. The redundant power supply system according to claim 1, wherein the output voltage is equal to or higher than a voltage obtained by adding, to the second voltage, a voltage drop due to a wiring from the redundant power supply to the second load.

3. The redundant power supply system according to claim 1, wherein the first load is a shift-by-wire device, and the second load is a brake device.

4. The redundant power supply system according to claim 1, wherein the redundant power supply includes a sub-power supply and a DCDC converter, and the DCDC converter is configured to convert a power from the sub-power supply into the backup power that is supplied to the first and second loads.

5. The redundant power supply system according to claim 1, wherein the notification about the failure of the main power supply is issued via a dedicated line connecting the redundant power supply and the first load.

* * * * *